(12) United States Patent
Decrisantis et al.

(10) Patent No.: US 7,779,644 B2
(45) Date of Patent: Aug. 24, 2010

(54) AIR CYCLE MACHINE FOR AN AIRCRAFT ENVIRONMENTAL CONTROL SYSTEM

(75) Inventors: Angelo A. Decrisantis, Avon, CT (US); James R. O'Coin, Somers, CT (US); Edmund P. Taddey, West Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 594 days.

(21) Appl. No.: 11/496,184

(22) Filed: Jul. 31, 2006

(65) Prior Publication Data

US 2008/0022688 A1 Jan. 31, 2008

(51) Int. Cl.
*F25D 9/00* (2006.01)
(52) U.S. Cl. ...................................................... 62/401
(58) Field of Classification Search .................. 62/401; 239/469; 454/254–339; 165/109.1
See application file for complete search history.

(56) References Cited

U.S. PATENT DOCUMENTS

| | | | | |
|---|---|---|---|---|
| 2,567,915 A | * | 9/1951 | Smith | 62/291 |
| 2,602,647 A | * | 7/1952 | Miller | 165/109.1 |
| 5,109,756 A | * | 5/1992 | Barboza et al. | 454/284 |
| 5,924,922 A | * | 7/1999 | Eakin et al. | 454/256 |
| 6,090,175 A | * | 7/2000 | Richard | 55/337 |
| 6,615,606 B2 | * | 9/2003 | Zywiak | 62/402 |
| 2005/0230095 A1 | * | 10/2005 | McBride et al. | 165/185 |

FOREIGN PATENT DOCUMENTS

JP 04-313638 * 5/1992

* cited by examiner

*Primary Examiner*—Frantz F. Jules
*Assistant Examiner*—Cassey Bauer
(74) *Attorney, Agent, or Firm*—Carlson, Gaskey & Olds PC

(57) ABSTRACT

An ECS system includes an ACM mounted adjacent an air-liquid heat exchanger through a diffuser that contains a diffuser plate. The diffuser plate receives airflow from the ACM which strikes the diffuser plate and flows radially outward and around the diffuser plate and into the air-liquid heat exchanger to provide minimal pressure loss and proper flow distribution into the air-liquid heat exchanger with significantly less packaging space.

7 Claims, 6 Drawing Sheets

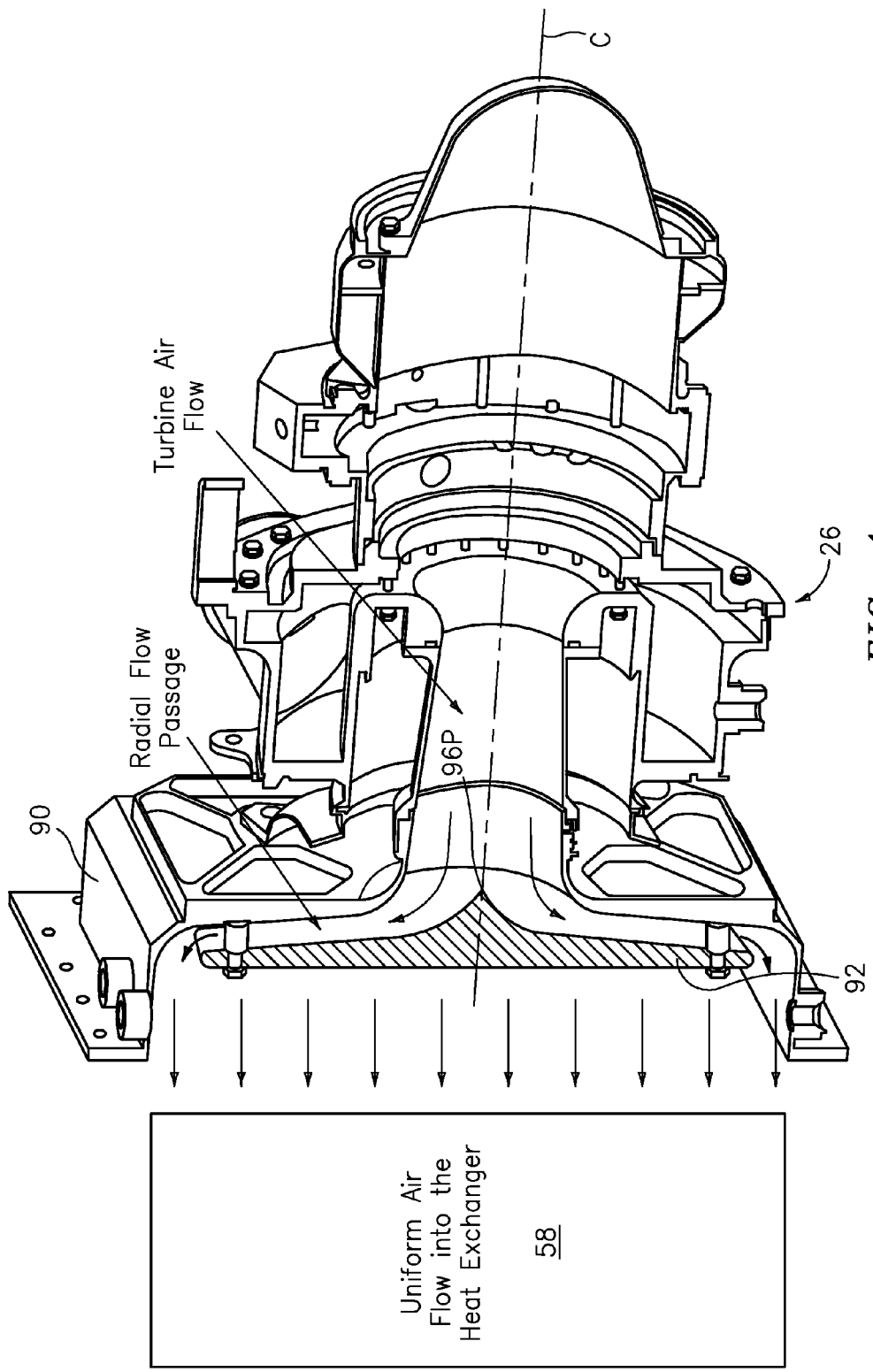

AIR CYCLE MACHINE FOR AN AIRCRAFT ENVIRONMENTAL CONTROL SYSTEM

This invention was made with government support under Contract No.: NAS2-03146 awarded by NASA. The government therefore has certain rights in this invention.

BACKGROUND OF THE INVENTION

The present invention relates to environmental control systems (ECSs), and more particularly to an air cycle machine (ACM) heat exchanger interface.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages. Interaction between the air and liquid subsystems may be relatively complex.

The ACM communicates airflow from the turbine to the liquid-to-air heat exchanger through a diffuser. The diffuser requires gradual transitions from the circular turbine exit to the rectilinear heat exchanger inlet to minimize irrecoverable pressure losses and achieve effective flow distribution. Although effective, such an arrangement may require relatively significant packaging space.

Accordingly, it is desirable to provide an ACM and diffuser heat exchanger interface which decreases packaging space therein.

SUMMARY OF THE INVENTION

The ECS system according to the present invention provides an ACM mounted adjacent a heat exchanger through a diffuser that contains a diffuser plate. The diffuser plate receives airflow from the ACM which strikes the diffuser plate and flows radially outward and around the diffuser plate and into the heat exchanger. A diffuser plate outer periphery is shaped to assure minimal pressure loss and proper flow distribution into the air-liquid heat exchanger with significantly less packaging space relative to conventional ACM arrangements.

The present invention therefore provides an ACM and diffuser heat exchanger interface which decreases packaging space therein.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is a sectional view of an ACM radial diffuser showing airflow therethrough;

DETAILED DESCRIPTION OF THE PREFERRED EMBODIMENT

Figure 1:
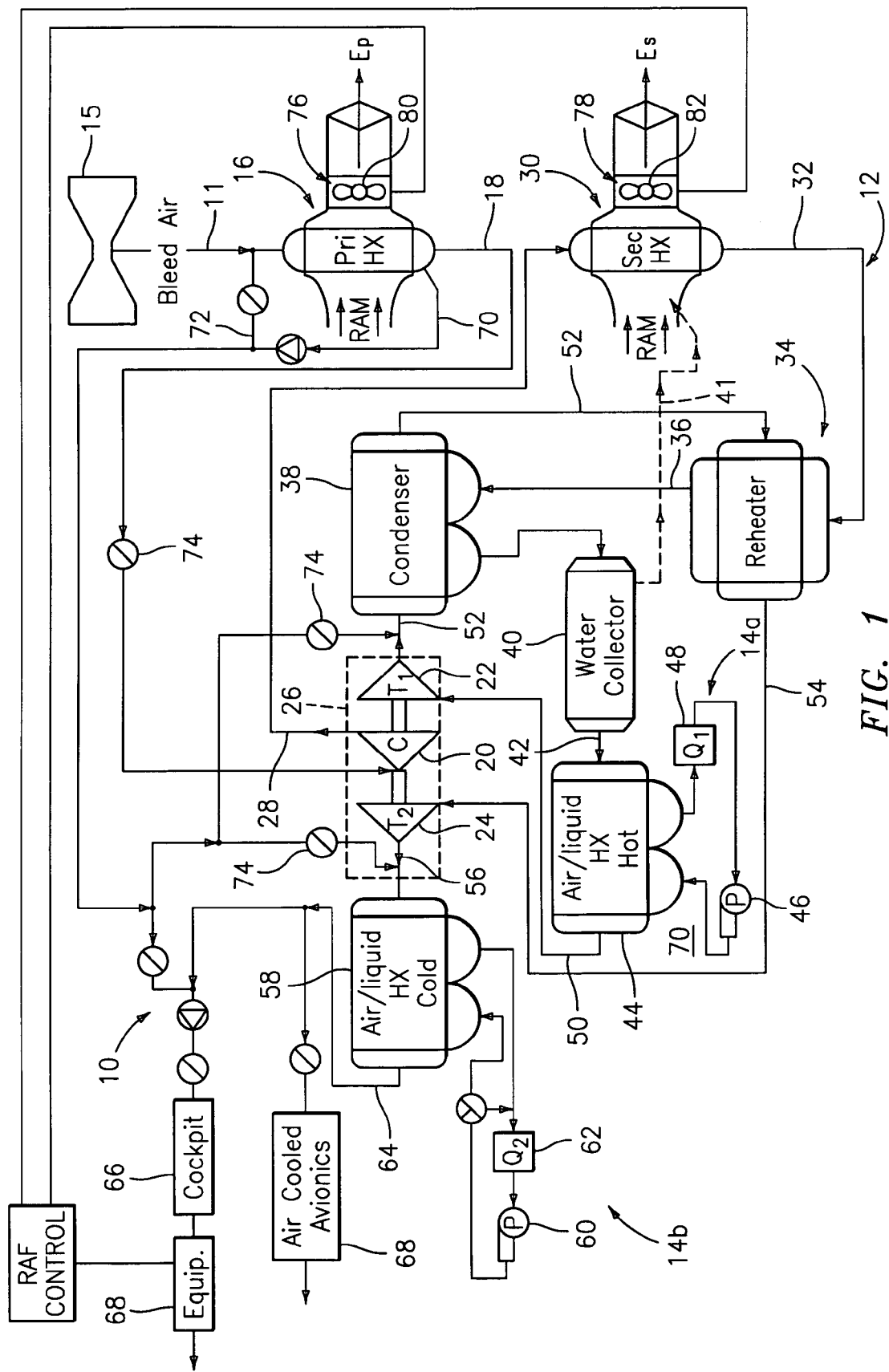
FIG. 1 is a schematic representation of environmental control system according to the present invention.

FIG. 1 illustrates a general schematic view of a liquid-to-air cycle system or environmental control system (ECS) 10. The ECS 10 includes an air cycle subsystem 12 that is in a heat exchange relationship with a liquid cycle subsystem 14a, 14b. It should be understood that although two separate liquid subsystems are disclosed in the illustrative embodiment, a single substantially continuous subsystem will also benefit from the present invention.

Bleed air 11 is preferably received from a gas turbine engine (illustrated schematically at 15). The bleed air 11 is sent through a primary heat exchanger 16 such that the bleed air 11 is in heat exchange relationship with RAM or ambient air. The primary heat exchanger 16 is preferably an air-to-air exchanger. After the bleed air 11 is cooled in the primary heat exchanger 16, the resulting cooler air is communicated through a passage 18 which communicates with a compressor 20 where the air is compressed to a high pressure. The compressor 20 is preferably located upon a common shaft with a first turbine 22 and a second turbine 24. The compressor 20 and turbines 22, 24 define an air cycle machine (ACM) 26.

Compressed air exits the compressor 20 through a passage 28 which communicates with a secondary heat exchanger 30. The secondary heat exchanger 30 is preferably an air-to-air exchanger which further cools the compressed air by heat exchange with a RAM air flow. Compressed, cooled and water vapor bearing air exits the secondary heat exchanger 30 and flows through a duct 32 which communicates with a reheater 34.

The reheater 34 further cools the water vapor bearing air which exits the reheater 34 through a passage 36. Passage 36 communicates with a condenser 38 which further cools the water vapor bearing air by condensing and separating the water into a water extractor 40. As the water vapor bearing air is passed directly from the reheater 34 to the condenser 38, the water from the water vapor condenses relatively easily.

Dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, moisture which may remain in the air is removed as the temperature of the air is increased by passage through the first air-liquid heat exchanger 44.

The liquid cycle subsystem 14a is preferably a closed system and utilizes a liquid coolant, such as polyalphaolephin (PAO) which is cycled by a pump 46 or the like. The liquid coolant functions as a coolant medium for a heat load 48 and as a heat source for the dehumidified air which is passing through passage 42. The heat load 48 is typically an avionics subsystem which generates a rather large amount of heat—typically around 160 degrees Fahrenheit. The heat exchange process therein between the liquid coolant in the liquid cycle subsystem 14a and the air communicated through passage 42 cools the liquid, removes heat from the load 48, and heats the air exiting the first air-liquid heat exchanger 44.

Dehumidified heated air exits the first air-liquid heat exchanger 44 through a passage 50 which communicates with the first turbine 22. The air is expanded through the first turbine of the ACM 26 between an inlet pressure of the first turbine 22 and an outlet pressure of the second turbine 24. The first turbine 22 also assists in condensing any water vapor which may still be in the air as a result of the air being expanded and thus cooled.

The recovered heat from the first air-liquid heat exchanger 44 is used by the first turbine 22, for example, to increase its rotating speed, boost its pressure ratio, increase its power and increase the expansion of the reheated air. Further, the first turbine 22 is mechanically engaged to the compressor 20 and the second turbine 24. Thus, heat or energy absorbed by the first turbine 22 is further converted to useful energy by the compressor 20.

The discharge pressure from the first turbine 22 is maintained at a discharge temperature just above freezing (mid-pressure) so that the first turbine 22 outlet air which passes through a passage 52 operates as a heat sink for the condenser 38 and the reheater 34. That Heated air exits the reheater 34 through a passage 54 which communicates with the second turbine 24. The recovered heat from the condenser 38 and the reheater 34 is used by the second turbine 24, for example, to increase its rotating speed, boost its pressure ratio, increase its power and increase the expansion of the reheated air. Thus, the performance of both turbines 22, 24 is improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 is preferably maintained at a discharge temperature just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14*b* to form a heat exchange relationship therebetween.

The liquid cycle subsystem 14*b* is preferably a closed system as described above. The liquid coolant of the liquid cycle subsystem 14*b* is cycled by a pump 60 and functions as a coolant medium for a second heat load 62. An operating temperature of the second heat load 62 is preferably lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14*b* and the air communicated through passage 56 cools the liquid, removes heat from the load 62, and heats the air exiting the second air-liquid heat exchanger 58. The relatively warmer air exits second air-liquid heat exchanger 58 through a passage 64 which communicates with cockpit 66 and/or other air loads 68 to provide cooling air therefor.

In the event that it is desired to modulate the supply from the first turbine 22, second turbine 24, cockpit 66 and/or the air loads 68, a temperature control passage 70, 72 communicates directly with bleed air 11 prior and/or subsequent to the primary heat exchanger 16. Control valves 74 are preferably located just downstream of the first turbine 22 and the second turbine 24, and just upstream of the cockpit 66 and/or the air loads 68 to allow warm air mixture therewith. Operation of such control valves may be implemented by a microprocessor based electronic control system.

The primary heat exchanger 16 and the secondary heat exchanger 30 preferably include a respective primary RAM air fan (RAF) system 76 and a secondary RAM air fan (RAF) system 78. Notably, the RAFs 76, 78 are located downstream of the respective heat exchangers 16, 30 in the RAM exhaust (illustrated schematically by arrows Ep, Es) such that temperature rise across the RAFs 76, 78 will not effect ECS performance. Each RAF 76, 78 includes an electric motor 80, 82 such that each RAF 76, 78 is driven at a speed independent of the ACM 26 which reduces generated noise and increases overall operating efficiency. Furthermore, as each RAF 76, 78 is driven by the independent RAF electric motors 80, 82 the RAF 76, 78 are preferably installed in the ECS systems 10 as self contained systems such as Line Replaceable Units (LRUs) which simplifies maintenance, improves reliability and performance while decreasing system weight.

Figure 2:
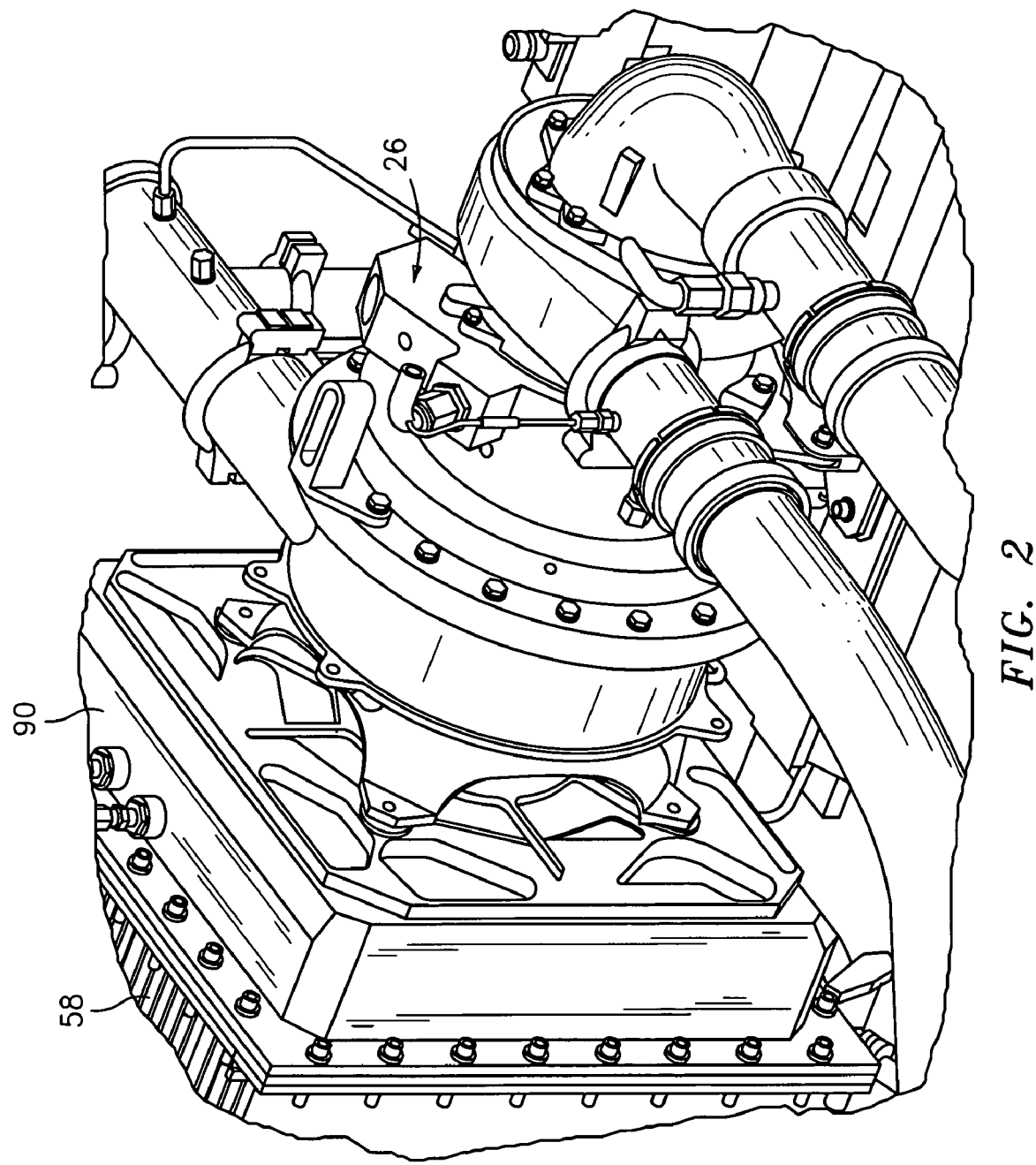
FIG. 2 is a perspective view of an ACM radial diffuser arrangement.

Referring to FIG. 2, the ACM 26 is mounted adjacent the air-liquid heat exchanger 58 through a diffuser 90. It should be understood that various mounting arrangements at various heat exchangers will be usable with the present invention.

Figure 3:
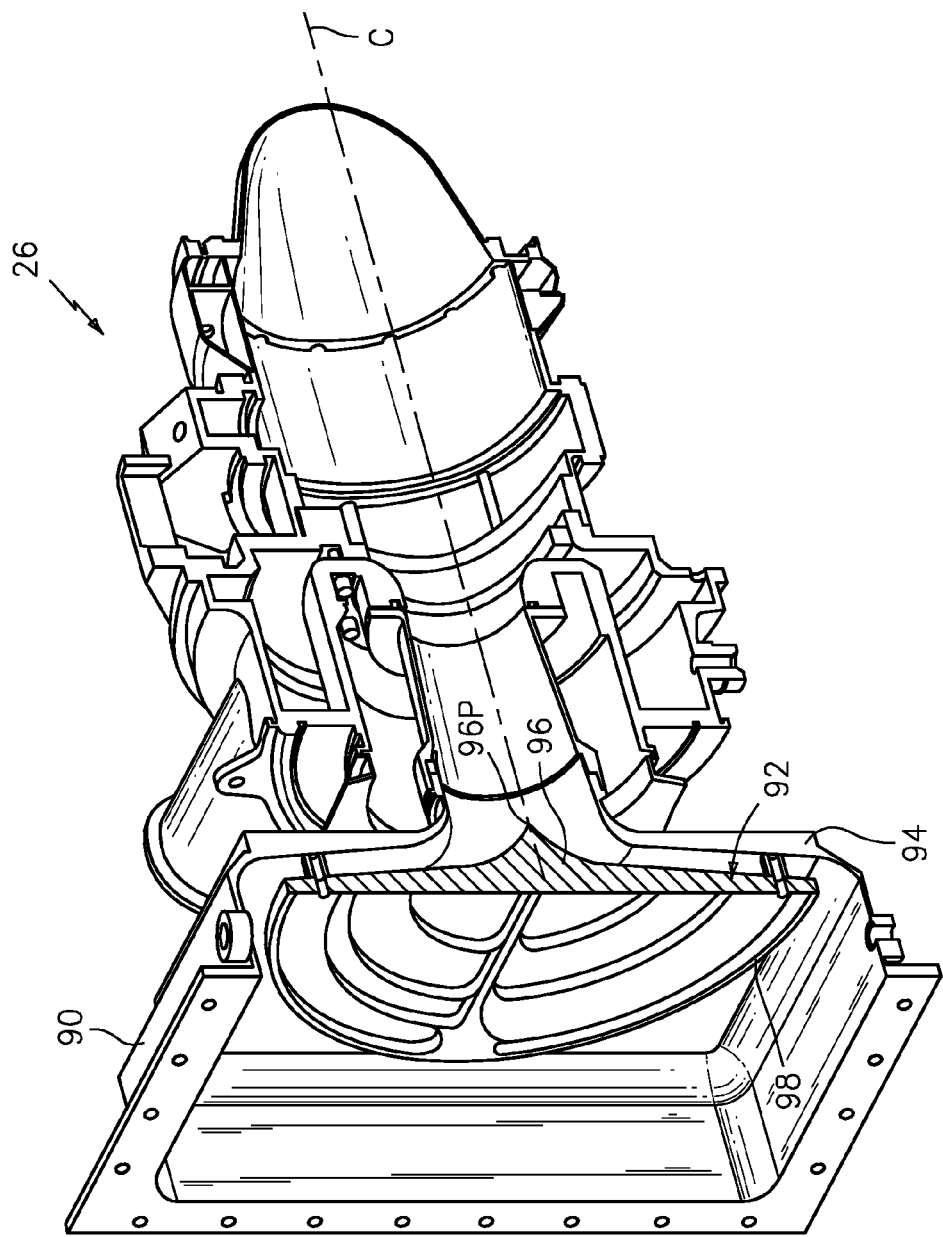
FIG. 3 is a sectional view of an ACM radial diffuser arrangement.

Referring to FIG. 3, the diffuser 90 contains a diffuser plate 92. The diffuser plate 92 is preferably spaced away from an inner wall 94 of the diffuser 90 upstream of the heat exchanger 58 (FIG. 2). The diffuser plate 92 receives airflow from the ACM. The airflow strikes the diffuser plate 92 and flows radially outward and around the diffuser plate 92 and into the heat exchanger 58 (FIG. 4).

Figure 5A:
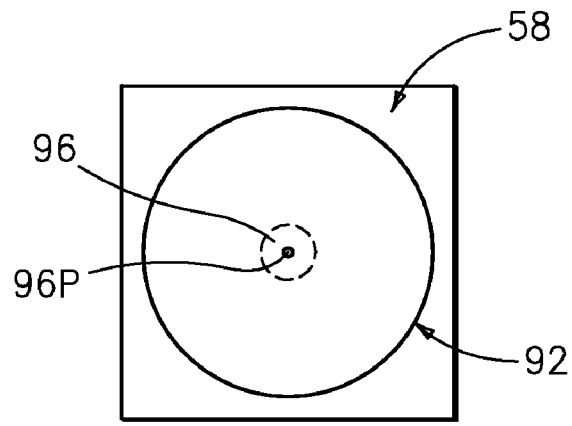
FIGS. 5A and 5B are schematic views of an ACM radial diffuser plate shape relative a heat exchanger shape.
Figure 5B:
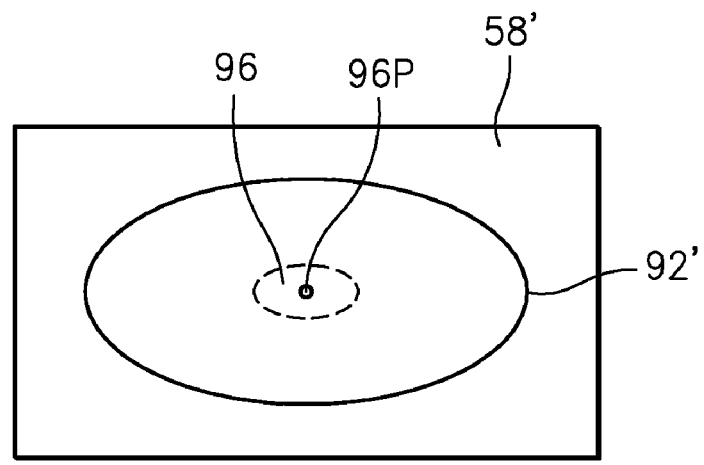

The diffuser plate 92 includes a central spike 96 having a point 96P defined along a centerline C of the ACM outlet. A diffuser plate outer periphery 98 (also illustrated in FIG. 4) is preferably shaped to assure minimal pressure loss and proper flow distribution into the air-liquid heat exchanger 58. It should be understood that although a generally circular outer periphery is preferred for a heat exchanger having a square cross-sectional profile (FIG. 5A), other diffuser plate outer peripheries are preferred for heat exchangers having other cross-sectional profiles such as an oval outer periphery 98' for a rectilinear cross-sectional profile heat exchanger (FIG. 5B). It should be understood that other plate shapes appropriate for the heat exchanger cross-sectional profile will also be usable with the present invention.

Figure 6:
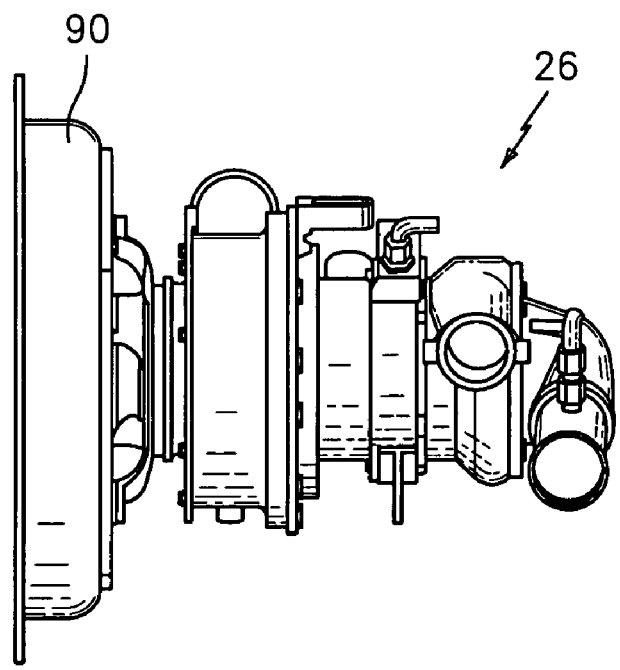
FIG. 6 is a side view of the diffuser compared to a prior art diffuser of FIG. 7.
Figure 7:
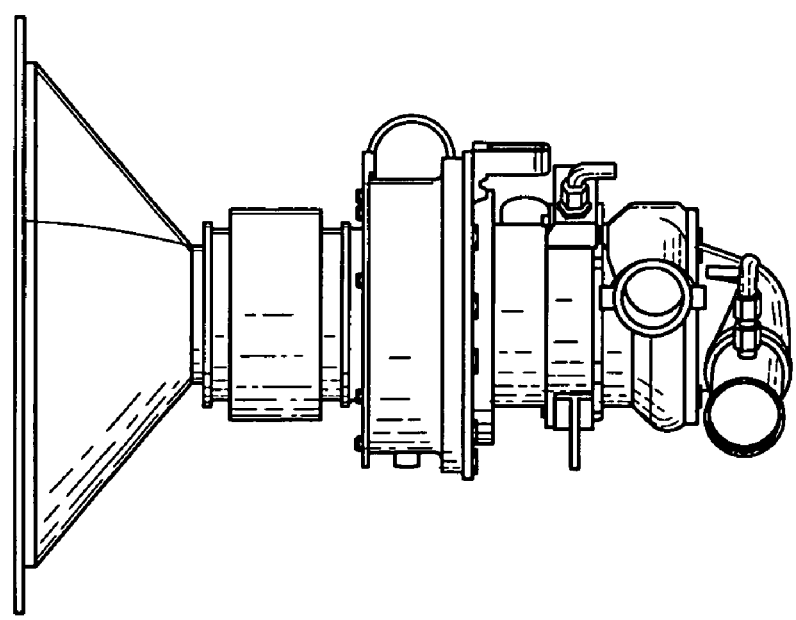

Referring to FIG. 6, the diffuser arrangement of the present invention provides an ACM of significantly less packaging space relative to conventional ACM arrangements (FIG. 7).

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air cycle machine comprising:
   a compressor mounted to a shaft which defines an axis of rotation;
   a turbine mounted to said shaft;
   an outlet from said turbine;
   a diffuser mounted to said outlet;
   a heat exchanger mounted adjacent said diffuser; and
   a diffuser plate upstream of said heat exchanger, said diffuser plate having a spike which defines a point to distribute airflow toward an outer periphery of the diffuser plate and toward said heat exchanger.

2. The machine as recited in claim 1, wherein said spike is defined along said axis of rotation.

3. The machine as recited in claim 1, wherein said outer periphery is related to a cross-sectional profile of said heat exchanger.

4. An environmental control system comprising:
   an air cycle machine having an outlet defined along an axis;
   a diffuser mounted adjacent said air cycle machine;
   a heat exchanger mounted adjacent said diffuser;
   a diffuser plate upstream of said heat exchanger, said diffuser plate having a spike which defines a point along said axis to distribute airflow toward an outer periphery of the diffuser plate and toward said heat exchanger.

5. The environmental control system as recited in claim 4, wherein said diffuser plate is mounted to said diffuser.

6. The environmental control system as recited in claim 4, wherein said spike extends toward said air cycle machine.

7. The machine as recited in claim 1, wherein said diffuser plate is spaced away from an inner wall of said diffuser upstream of said heat exchanger.

* * * * *